United States Patent
Frum et al.

(10) Patent No.: US 9,545,818 B2
(45) Date of Patent: Jan. 17, 2017

(54) SYSTEMS AND METHODS FOR IMPROVED DIFFERENTIAL LOCKS

(71) Applicant: AxleTech International IP Holdings, LLC, Troy, MI (US)

(72) Inventors: Marius Frum, Clawson, MI (US); Dan Ursu, Windsor (CA); Barry Groves, Pontiac, MI (US)

(73) Assignee: AXLETECH INTERNATIONAL IP HOLDINGS, LLC, Troy, MI (US)

( * ) Notice: Subject to any disclaimer, the term of this patent is extended or adjusted under 35 U.S.C. 154(b) by 33 days.

(21) Appl. No.: 14/624,288

(22) Filed: Feb. 17, 2015

(65) Prior Publication Data

US 2015/0231918 A1  Aug. 20, 2015

Related U.S. Application Data

(60) Provisional application No. 61/940,874, filed on Feb. 18, 2014.

(51) Int. Cl.
| | |
|---|---|
| *B60B 11/02* | (2006.01) |
| *F16H 48/24* | (2006.01) |
| *F16H 48/32* | (2012.01) |
| *F16H 48/34* | (2012.01) |

(52) U.S. Cl.
CPC .............. *B60B 11/02* (2013.01); *F16H 48/24* (2013.01); *F16H 48/32* (2013.01); *F16H 48/34* (2013.01)

(58) Field of Classification Search
CPC ....................................................... B60B 11/02
See application file for complete search history.

(56) References Cited

U.S. PATENT DOCUMENTS

| | | | | |
|---|---|---|---|---|
| 1,670,100 | A | * | 5/1928 | Deitrich .................. B60B 11/02 305/1 |
| 1,959,147 | A | * | 5/1934 | Angell .................... B60B 11/06 123/195 H |
| 1,994,719 | A | * | 3/1935 | Lichty .................. B60K 17/043 180/24.03 |
| 2,121,254 | A | | 6/1938 | Meinke |
| 2,135,568 | A | * | 11/1938 | Durham .................. B60B 11/02 188/18 R |
| 2,260,828 | A | * | 10/1941 | Burger .................... B60B 11/06 188/18 R |

(Continued)

OTHER PUBLICATIONS

United States International Searching Authority, International Search Report and Written Opinion for International Application No. PCT/US2015/016178 mailed May 20, 2015.

*Primary Examiner* — Sherry Estremsky
(74) *Attorney, Agent, or Firm* — Howard & Howard Attorneys PLLC

(57) ABSTRACT

A dual-wheel differential system includes an in inner hub, an outer hub, and a differential assembly mechanically coupled between the inner hub and the outer hub to allow the inner hub and the outer hub to rotate at different angular speeds. A user-actuatable locking system is configured to mechanically lock the inner hub to the outer hub. The user-actuatable locking system may include at least one axially-translating or radially-translating locking pin configured to engage at least one of the inner hub and the outer hub. The locking system may be pneumatically, hydraulically, or electromechanically actuated.

16 Claims, 3 Drawing Sheets

(56) References Cited

U.S. PATENT DOCUMENTS

| | | | |
|---|---|---|---|
| 2,727,582 A * | 12/1955 | Lisenby | B60B 11/02 |
| | | | 180/24.03 |
| 5,947,859 A | 9/1999 | McNamara | |
| 6,527,073 B1 * | 3/2003 | Bowman | B60K 17/36 |
| | | | 180/22 |
| 7,607,677 B1 | 10/2009 | Bosak | |
| 2012/0244987 A1 | 9/2012 | Haugeberg | |

* cited by examiner

SYSTEMS AND METHODS FOR IMPROVED DIFFERENTIAL LOCKS

CROSS-REFERENCE TO RELATED APPLICATIONS

This application claims priority to U.S. Prov. Pat. App. No. 61/940,874, filed Feb. 18, 2014, the contents of which are hereby incorporated by reference.

TECHNICAL FIELD

The technical field generally relates to differential wheel ends and axles, and more particularly relates to dual-wheel differential systems.

BACKGROUND

Wheel ends having a dual-wheel configuration are often used in connection with large vehicles. Such wheel ends typically include a planetary wheel end gear reduction and may use a differential configured to allow the two hubs to rotate at different angular speeds. This accommodates the difference in distance experienced by the two wheels during turns, and thereby greatly improves tire lifetime.

Wheel end differentials are typically operated in an "open" mode; however, it is often desirable in some circumstances to lock the various components of the differential together to increase traction. In this regard, currently known differential locking mechanisms are unsatisfactory in a number of respects. For example, many locking mechanisms require the operator to leave the cab of the vehicle and mechanically lock the differential components by actuating difficult-to-reach nuts or the like.

Accordingly, it is desirable to provide improved dual-wheel differential locking mechanisms. Furthermore, other desirable features and characteristics of the present invention will become apparent from the subsequent detailed description and the appended claims, taken in conjunction with the accompanying drawings and the foregoing technical field and background.

SUMMARY

A differential locking system in accordance with one embodiment includes an in inner hub, an outer hub, a differential assembly mechanically coupled between the inner hub and the outer hub to allow the inner hub and the outer hub to rotate at different angular speeds, and a user-actuatable locking system configured to mechanically lock the inner hub to the outer hub. The user-actuatable locking system may include, for example, at least one radially or axially translating locking pin, which may be actuated in a variety of ways, such as electromechanically, pneumatically, or hydraulically.

In accordance with another embodiment, a user-actuatable locking apparatus is provided for a dual-wheel differential system of the type having in inner hub, an outer hub, and a differential assembly mechanically coupled therebetween. The user-actuatable locking apparatus includes an actuation system and at least one translating locking pin communicatively coupled to the actuation system, the at least one translating locking pin configured to selectively lock and unlock the inner hub to the outer hub in response to the actuation system.

A dual-wheel differential locking method in accordance with one embodiment includes providing, between an in inner hub and an outer hub, a differential assembly mechanically configured to allow the inner hub and the outer hub to rotate at different angular speeds; and actuating a locking system to selectively lock and unlock the inner hub to the outer hub such that the inner hub and the outer hub rotate at substantially the same angular speed.

DESCRIPTION OF THE DRAWINGS

The exemplary embodiments will hereinafter be described in conjunction with the following drawing figures, wherein like numerals denote like elements, and wherein.

DETAILED DESCRIPTION

In general, the subject matter described herein relates to improved differential locking systems. In some embodiments, the locking mechanism includes a radially translating locking pin, while in others the locking mechanism includes an axially translating locking pin. Furthermore, the various embodiments may be manually mechanically actuated (e.g., via a convenient fixture easily accessible via the wheel end) or may be actuated via a module or subsystem that the operator engages from within the cab of the vehicle (e.g., via an electromechanical, hydraulic, or pneumatic locking system). The following detailed description is merely exemplary in nature and is not intended to limit the disclosure or the application and uses thereof. Furthermore, there is no intention to be bound by any theory presented in the preceding background or the following detailed description.

Figure 1:
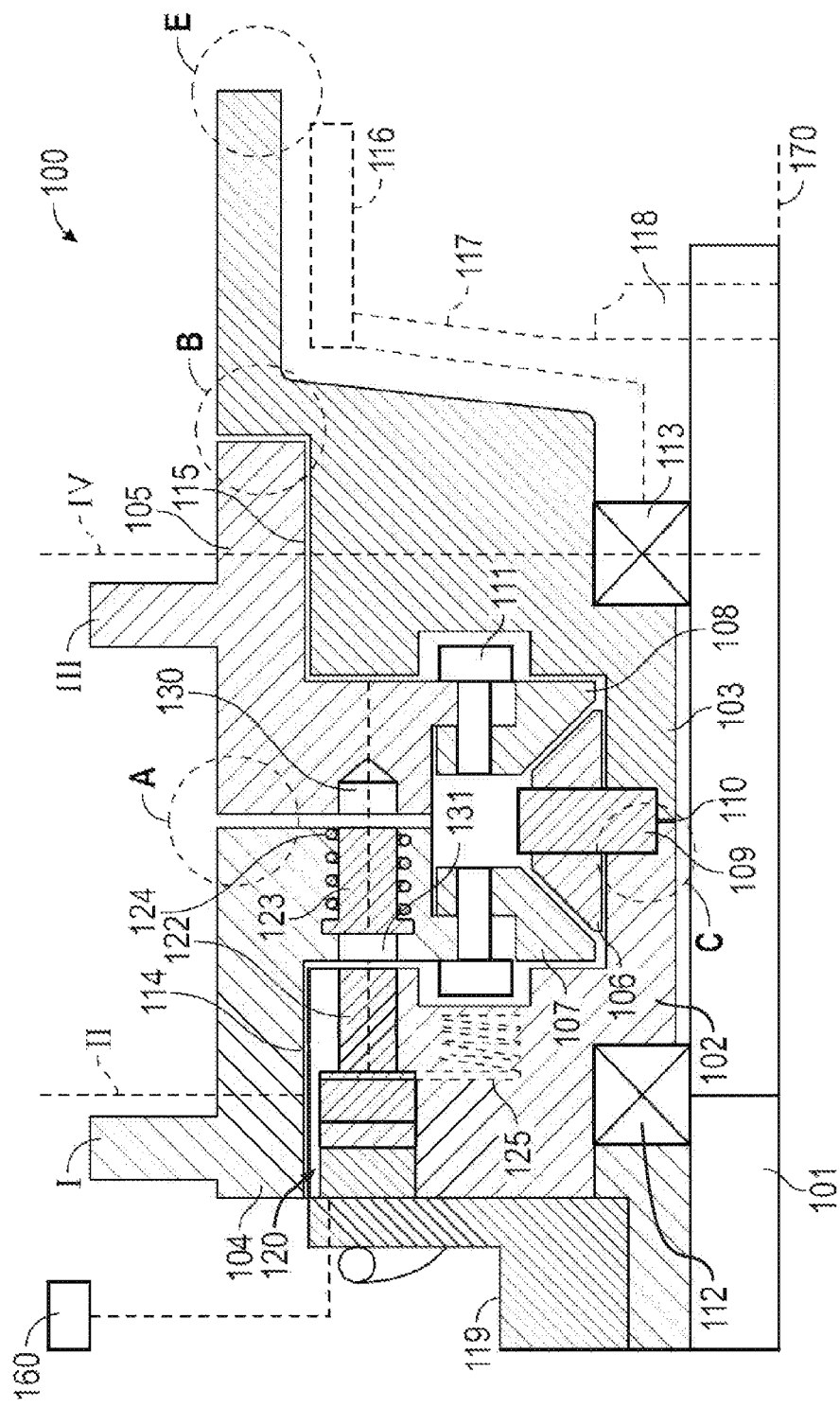
FIG. 1 is a cross-sectional overview of a differential wheel end locking system in accordance with one embodiment.

FIG. 1 depicts a cross-sectional view of a wheel end 100 in accordance with an embodiment that incorporates an axial, electronically actuated locking mechanism as described in further detail below. In the interest of clarity, FIG. 1 depicts only half of a wheel end, which will be understood to exhibit symmetry about its a rotational axis 170. While the electromagnetic locking mechanism and differential system described below may be used in a wide range of wheel ends, FIG. 1 discloses one such example, and is not intended to be limiting. Wheel end 100 may be incorporated into various trucks, construction vehicles, and any other form of transportation that might typically incorporate differential wheel ends and axles.

In general, wheel end 100 includes a central spindle 101, an inner differential case 102, an outer differential case 103, an inner wheel hub (or simply "inner hub") 104, an outer differential hub (or simply "outer hub") 105, a differential pinion 106, differential side gears 107 and 108, a differential pinion pin 109, a gasket 110, a side gear fastener 111, and an inner wheel bearing 112. Wheel end 100 further includes an outer wheel bearing 113, bushings/bearings 114 and 115, a ring gear 116, a ring gear hub 117, a spindle nut 118, and a brake driver 119. Collectively, items 106, 107, 108, 109 form what may be referred to herein as a "differential assembly" that is mechanically coupled (e.g., via fasteners 111) to hubs 104 and 105 as shown, thereby allowing the inner hub 104 and outer hub 105 to rotate at different angular speeds (through the action of differential pinion 106), as is known in the art.

With continued reference to FIG. 1, reference numeral I indicates the inner hub flange (e.g., a full flange), reference numerals II and IV indicate the centerlines of the rims (and respective wheel loads), reference numeral III indicates an outer hub flange (e.g., a scalloped flange). Regions A and B correspond to one or more sealing solutions, such as a face seal or labyrinth. Region C corresponds to a pin locking solution (e.g., a dowel pin). Region E corresponds to a differential case-to-planetary spider connection (e.g., bolted joint or splined joint). Those skilled in the art will recognize in FIG. 1 various differential components and subsystems (e.g., planetary gears, side gears, and the like), the subject matter is not limited to the particular differential geometry shown in the drawings.

FIG. 1 also illustrates a user-actuatable locking system that includes at least one axially-translating locking pin configured to engage both inner hub 104 and outer hub 105. In that regard, as used herein, "axially" refers to a direction or orientation parallel to axis 170, and "radially" refers to an orientation perpendicular to and intersecting axis 170. In the illustrated embodiment, the user-actuatable locking system includes an electromechanical component 120, a first locking pin 122, and a second locking pin 123. In the OFF position (as determined via module 160), electromagnetic component 120 is in an unlocked position as illustrated in FIG. 1. In the ON position, however, electromagnetic component 120 pushes out (either directly or indirectly) a pin or set of locking pins 122 into a cylindrical gap 131 to lock the inner hub 104 (i.e., with respect to differential case 103). Pin 122, as it extends, further impinges upon and translates pin 123 such that it extends into cylindrical gap 130 to thereby lock the outer hub 105. When the electromagnetic component 120 is switched back to an OFF state (via module 160), pins 123 and 122 return to the unlocked position via return springs 124 and 125, which are respectively coupled to pins 123 and 122 as shown. In other embodiments, pins 123 and springs 125 are not included (i.e., only one set of springs and pins are used). Electromagnetic component 120 may be implemented in a variety of ways. In one embodiment, for example, component 120 comprises an EATON ELOCKER actuator. Similarly, module 160 may consist of any combination of hardware and software capable of actuating electromagnetic component 120. In one embodiment, module 160 is located within the cab of the vehicle in which wheel end 100 is being used, thereby allowing for convenient unlocking and locking of hubs 104 and 105.

Figure 2:
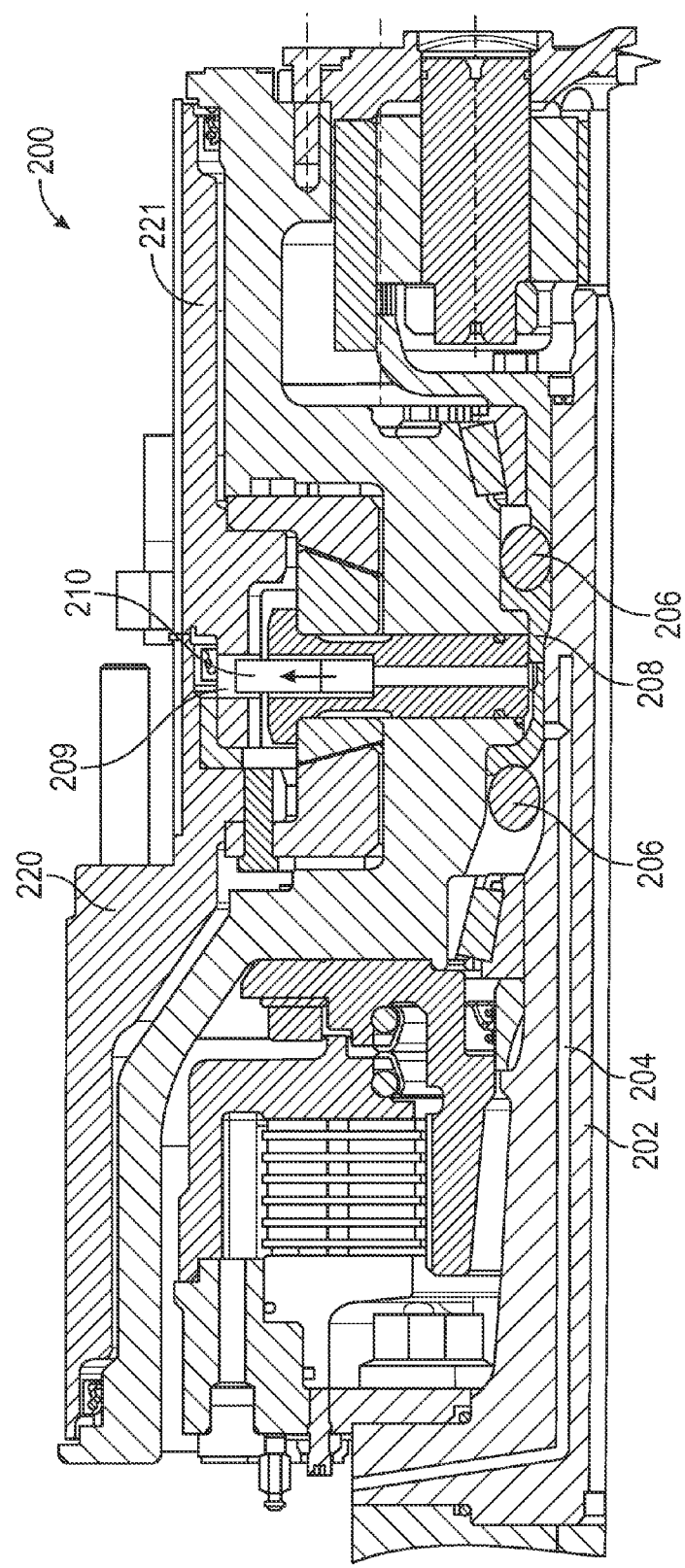
FIG. 2 is cross-sectional overview of a differential wheel end locking system in accordance with another embodiment.

FIG. 2 illustrates a pneumatic actuation system for a wheel end 200 in accordance with another embodiment, in which actuation and locking of an inner hub 220 and an outer hub 221 is accomplished using air pressure from, for example, the vehicle's compressor (not illustrated) or other suitable pressure source. Those skilled in the art will recognize in FIG. 2 the various dual-wheel differential components (or analogs thereof) previously described in connection with FIG. 1.

In one embodiment, wheel end 200 is equipped with CTIS (Central Tire Inflation System) components and the spindle 202 includes an air passage 204 drilled or otherwise formed from a flange end to a middle region (e.g., between the hubs 220, 221, as shown.). Two sealing components 206 contain the air 208 and direct it to the actuation pins 210. The air pressure pushes the pins outward (in a radial direction) into a receiving gap 209, thereby locking outer hub 221 and inner hub 220 as shown. In this way, the differential mechanism that is attached to inner hub 220 is locked rotationally with outer hub 221.

In an alternate embodiment, hydraulic actuation is employed. That is, actuation is similar to the pneumatic case described above in connection with FIG. 2, except that hydraulic oil is used in place of air. As will be understood, heavy duty, off-highway vehicles and machines often use WDB (Wet Disk Brakes), which include their own hydraulic systems that run independently. Accordingly, a separate hydraulic line may be run in parallel to the brake circuit to actuate the locking pins 210.

Figure 3:
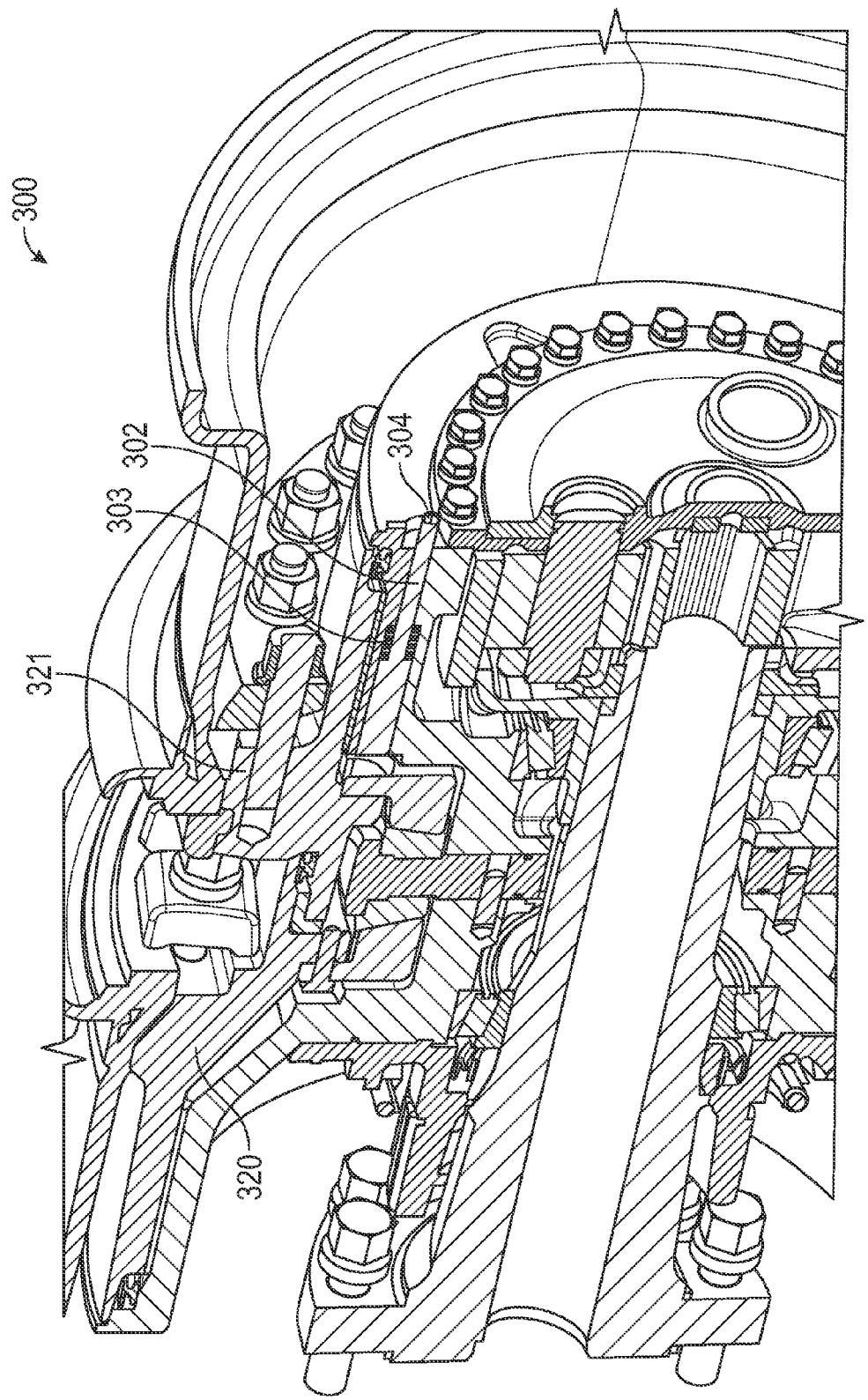
FIG. 3 is a cut-away cross-sectional view of differential wheel end locking system in accordance with another embodiment.

FIG. 3 depicts a self-contained, manually engaged and disengaged locking pin arrangement for a wheel end 300 that allows locking of the two independently rotating wheel hubs 320 and 321. In this embodiment, the locking system includes a nut or other externally accessible mechanical component 304, an internal return spring 303, and an elongated pin 302. Pin 302 and the opening in which it moves have two different diameters, as shown. One end of pin 302 is threaded to accept nut 304. The spring extends the pin into radially-oriented slots or holes in the differential housing, thereby locking the wheel hub to the differential. Multiple pins can be used to provide suitable strength. Nut 304 on the threaded end of pin 302 compresses the spring 303 and extracts the pin 302 from the differential housing.

In summary, methods and apparatus have been provided for improved dual wheel differential locking systems. In some embodiments, the locking mechanism includes a radially-translating locking pin, while in others the locking mechanism includes an axially-translating locking pin. The embodiments may be manually, mechanically actuated (e.g., via a convenient fixture easily accessible via the wheel end) or may be actuated via a module or subsystem that the operator engages from within the cab of the vehicle (e.g., via an electromechanical, hydraulic, or pneumatic subsystem).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Further, there is no intention to be bound by any expressed or implied theory presented in the preceding technical field, background, or detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. It should be understood that various changes can be made in the function and arrangement of elements without departing from the scope of the disclosure.

What is claimed is:
1. A dual-wheel differential system including:
   a wheel end comprising,
      a central spindle defining a rotational axis;
      an inner hub supported on said central spindle and rotatable about said rotational axis;
      an outer hub supported on said central spindle and rotatable about said rotational axis;

a differential assembly mechanically coupled between the inner hub and the outer hub to allow the inner hub and the outer hub to rotate at different angular speeds; and a user-actuatable locking system comprising, at least one locking pin engaging the inner hub and the outer hub to mechanically lock the inner hub to the outer hub during rotation of the outer hub and the inner hub; wherein the at least one locking pin is further defined as a first locking pin engaging the inner hub and a second locking pin engaging the outer hub when the first locking pin impinges upon the second locking pin.

2. The system of claim 1, wherein the user-actuatable locking system includes at least one axially-translating locking pin engaging the inner hub and the outer hub.

3. The system of claim 2, wherein the at least one axially-translating locking pin is electromechanically actuated.

4. The system of claim 2, wherein the at least one axially-translating locking pin is hydraulically or pneumatically actuated.

5. The system of claim 1, wherein at least one of the first and second locking pins are spring loaded.

6. The system of claim 1, wherein the wheel end further comprises an outer differential case with the first locking pin securing the inner hub to the outer differential case.

7. The system of claim 1, wherein the user-actuatable locking system includes at least one radially-translating locking pin engaging the inner hub to the outer hub.

8. The system of claim 7, wherein the at least one radially-translating locking pin is electromechanically actuated.

9. A method of locking a dual-wheel differential system having a wheel end with a central spindle, an inner hub supported on the spindle, and an outer hub supported on the spindle, and a locking system, said method comprising the steps of:

actuating the locking system to selectively lock the inner hub to the outer hub such that the inner hub and the outer hub rotate at substantially the same angular speed; and actuating the locking system to selectively unlock the inner hub from the outer hub such that the inner hub and the outer hub rotate at different angular speeds; wherein the locking system includes at least one axially or radially translating locking pin configured to engage the inner hub and the outer hub to mechanically lock the inner hub to the outer hub during rotation of the outer hub and the inner hub, and wherein the at least one axially or radially translating locking pin is electromechanically, pneumatically, or hydraulically actuated.

10. A dual-wheel differential system including:

a wheel end comprising, a central spindle defining a rotational axis, an inner hub supported on said central spindle and rotatable about said rotational axis, an outer hub supported on said central spindle and rotatable about said rotational axis, a differential assembly mechanically coupled between the inner hub and the outer hub to allow the inner hub and the outer hub to rotate at different angular speeds, with said differential assembly comprising a differential housing defining a plurality of radially-oriented slots, and a locking system comprising, an elongated pin extending through one of the radially-oriented slots in the differential housing to lock one of the outer and inner hubs to the differential assembly.

11. The system of claim 10, wherein the locking system includes an internal return spring for extending the elongated pin into the radially-oriented slots of the differential housing for locking one of the outer or inner hubs to the differential assembly.

12. A dual-wheel differential system including:

a wheel end comprising, a central spindle defining a rotational axis;

an inner hub supported on said central spindle and rotatable about said rotational axis;

an outer hub supported on said central spindle and rotatable about said rotational axis;

a differential assembly mechanically coupled between the inner hub and the outer hub to allow the inner hub and the outer hub to rotate at different angular speeds; and a user-actuatable locking system comprising, at least one axially-translating locking pin engaging the inner hub and the outer hub to mechanically lock the inner hub to the outer hub during rotation of the outer hub and the inner hub; wherein the axially-translating locking pin is electromagnetically, hydraulically, or pneumatically actuated.

13. The system of claim 12, wherein the at least one axially-translating locking pin is actuated via an air passage in pneumatic communication with a pressure source.

14. A dual-wheel differential system including:

a wheel end comprising, a central spindle defining a rotational axis;

an inner hub supported on said central spindle and rotatable about said rotational axis;

an outer hub supported on said central spindle and rotatable about said rotational axis;

a differential assembly mechanically coupled between the inner hub and the outer hub to allow the inner hub and the outer hub to rotate at different angular speeds; and a user-actuatable locking system comprising, at least one radially-translating locking pin engaging the inner hub and the outer hub to mechanically lock the inner hub to the outer hub during rotation of the outer hub and the inner hub; wherein the radially-translating locking pin is electromagnetically, hydraulically, or pneumatically actuated.

15. The system of claim 12, wherein the at least one radially-translating locking pin is actuated via an air passage in pneumatic communication with a pressure source.

16. The system of claim 15, wherein the pressure source is a central tire inflation system.

* * * * *